United States Patent
Oballa et al.

(10) Patent No.: US 7,563,359 B2
(45) Date of Patent: Jul. 21, 2009

(54) INTEGRATED PROCESS TO CONVERT HEAVY OILS FROM OIL SANDS TO PETROCHEMICAL FEEDSTOCK

(75) Inventors: Michael C. Oballa, Cochrane (CA); Andrzej Krzywicki, Calgary (CA); Sunny Ying-Shing Wong, Calgary (CA); Anthony Tse, Calgary (CA); Abdul Alim Fakih, Calgary (CA)

(73) Assignee: Nova Chemical (International) S.A. (CH)

( * ) Notice: Subject to any disclaimer, the term of this patent is extended or adjusted under 35 U.S.C. 154(b) by 397 days.

(21) Appl. No.: 11/131,074

(22) Filed: May 17, 2005

(65) Prior Publication Data
US 2005/0258073 A1    Nov. 24, 2005

(30) Foreign Application Priority Data
May 19, 2004    (CA)    ................................. 2467499

(51) Int. Cl.
*C10G 45/02* (2006.01)
(52) U.S. Cl. .................... 208/212; 208/67; 208/113; 208/143; 585/476
(58) Field of Classification Search ............... 208/67, 208/113
See application file for complete search history.

(56) References Cited

U.S. PATENT DOCUMENTS

| | | | |
|---|---|---|---|
| 3,293,192 A | 12/1966 | Maher et al. | 252/430 |
| 3,308,069 A | 3/1967 | Wadlinger et al. | 252/455 |
| 3,442,795 A | 5/1969 | Kerr et al. | 208/120 |
| 3,449,070 A | 6/1969 | McDaniel et al. | 23/111 |
| 3,923,639 A | 12/1975 | Ciric | 208/111 |
| 3,972,983 A | 8/1976 | Ciric | 423/328 |
| 4,016,218 A | 4/1977 | Haag et al. | 260/671 R |
| 4,065,379 A * | 12/1977 | Soonawala et al. | 208/67 |
| 4,202,758 A | 5/1980 | O'Hara et al. | 208/143 |
| 4,401,556 A | 8/1983 | Bezman et al. | 208/111 |
| 4,851,601 A | 7/1989 | Fukuda et al. | 585/241 |
| 5,152,885 A | 10/1992 | Singhal et al. | 208/254 H |
| 5,520,799 A | 5/1996 | Brown et al. | 208/143 |
| 6,454,933 B2 * | 9/2002 | Ito et al. | 208/113 |

OTHER PUBLICATIONS

The Kirk Othmer Encyclopedia of Chemical Technology, Third Edition, vol. 15, Molecular Sieves, pp. 638-668.

The Kirk Othmer Encyclopedia of Chemical Technology, Fourth Edition, vol. 16, Molecular Sieves, pp. 888-925.

* cited by examiner

*Primary Examiner*—Tam M Nguyen
(74) *Attorney, Agent, or Firm*—Kenneth H Johnson

(57) ABSTRACT

An aromatics/naphthalene rich stream obtained by processing heavy gas oil derived from tar sands and cycle oils derived from cracking heavy gas oil may optionally be blended and subjected to a hydrogenation process and a ring opening reaction typically in the presence of a zeolite, alumina, or silica alumina based catalyst which may contain noble metals and or copper or molybdenum to produce paraffinic feedstocks for further chemical processing.

4 Claims, 1 Drawing Sheet

INTEGRATED PROCESS TO CONVERT HEAVY OILS FROM OIL SANDS TO PETROCHEMICAL FEEDSTOCK

FIELD OF THE INVENTION

The present invention relates to a process to convert a heavy aromatic rich stream into a saturated hydrocarbon stream, preferably a $C_{2-10}$ paraffin stream. More particularly the present invention relates to an integrated process for the treatment of atmospheric/vacuum residue from the cracking of heavy oils, and in particular the cracking of heavy oils derived from bitumen or tar sands and/or pyrolysis fuel oils (PFO) from steam cracking units.

BACKGROUND OF THE INVENTION

In Alberta today about 650,000 barrels per day of mined bitumen is upgraded to synthetic crude oil (SCO). The mining is carried out in a vast area in northern Alberta (Athabasca region), where tar sands/oil sands are abundant. The SCO has several advantages as it has no residue. It is also low in sulphur and nitrogen. However, this SCO or even bitumen from that region in Alberta is rich in aromatics. To date, effort has been focused in trying to use this SCO or bitumen to produce distillates for the automobile industry—mainly diesel and gasoline. This invention arises from a focused study on how best to use the highly aromatic feedstock and transform it into a petrochemical feed (i.e. to paraffins for the production of olefins in steam crackers).

Planned expansions in the Alberta oil sands industry show that there will be large quantities of bitumen and tar sands derived oils in the market with the potential of having reasonable prices, making them attractive to use as feed to petrochemical plants.

U.S. Pat. No. 4,202,758 issued May 13, 1980 in the name of O'Hara et al., assigned to UOP Inc. teaches a process for hydroprocessing hydrocarbons and in particular the ring opening of aromatic ring compounds in a feed stream to produce saturated hydrocarbons and in particular jet fuel. The patent teaches the use of group VIB or group VIII catalyst on a zeolite support for such hydroprocessing. The feedstock appears to be any feedstock which will take up hydrogen. The process is not an integrated process for the treatment of pyrolysis fuel oil and/or gas oil preferably heavy gas oil derived from oil sands or bitumen.

U.S. Pat. No. 5,152,885 issued Oct. 26, 1992 to Singhal et al., assigned to Exxon Research and Engineering Company teaches a process for removing heteroatoms from heavy feedstocks such as heavy coker gas oil or coal derived gas oils, or shale oils. The feedstock is treated with a catalyst comprising one or more noble metals such as platinum, palladium, rhodium and iridium at least one group 6, 8, 9, 10 or 11 metals such as nickel, iron or copper, supported on alumina. The process is not an integrated process for the treatment of pyrolysis fuel oil and/or gas oil preferably heavy oils from an upgrader which processes oils derived from tar sands or bitumen.

U.S. Pat. No. 5,520,799 issued May 28, 1996 to Brown et al., assigned to Mobil Oil Corporation, teaches a process for hydroprocessing a light cycle oil having high and low heteroatom contents to produce, jet fuel and the like. The light cycle oil is typically the co-product from a fluidized bed catalytic cracking unit and typically contains bicyclic aromatic compounds. The process is not an integrated process for the treatment of pyrolysis fuel oil and/or gas oils, preferably from a tar sands upgrader, and transforming them into petrochemicals feedstock.

The present invention seeks to provide an integrated process for the treatment of an aromatic rich heavy stream which is either an aromatic rich stream obtained by the distillation of a pyrolysis fuel oil, and/or from the catalytic cracking of gas oils derived from bitumen or oil sands processing, or both in a weight ratio of 10:1 to 1:10 in the presence of a catalyst to produce a stream of saturated hydrocarbons such as paraffins and a co-product stream. Preferably the saturated hydrocarbon stream may be used in further petrochemicals processes such as steam cracking to produce olefins.

SUMMARY OF THE INVENTION

The present invention provides an integrated process for the production of paraffins and olefins from a feedstock selected from the group consisting of pyrolysis fuel oil, heavy gas oils derived from oil sands and a mixture thereof comprising:

a) distilling pyrolysis fuel oil in a distillation unit under vacuum to separate the lighter fractions from the "aromatics/naphthalene rich stream" and the residue;

b) cracking heavy gas oils derived from oil sands in a catalytic cracking unit so as to produce mainly olefins, gasoline and "cycle oils" which are rich in aromatic compounds;

c) optionally combining the aromatics rich "cycle oils" from gas oil and the "aromatics/naphthalene rich stream" from pyrolysis fuel oil; and d) processing the resulting stream(s) in an integrated unit for removal of hetero atoms, aromatics saturation and ring cleavage to produce mainly paraffinic petrochemicals feedstocks ("ARORINCLE process").

DETAILED DESCRIPTION

Figure 1:
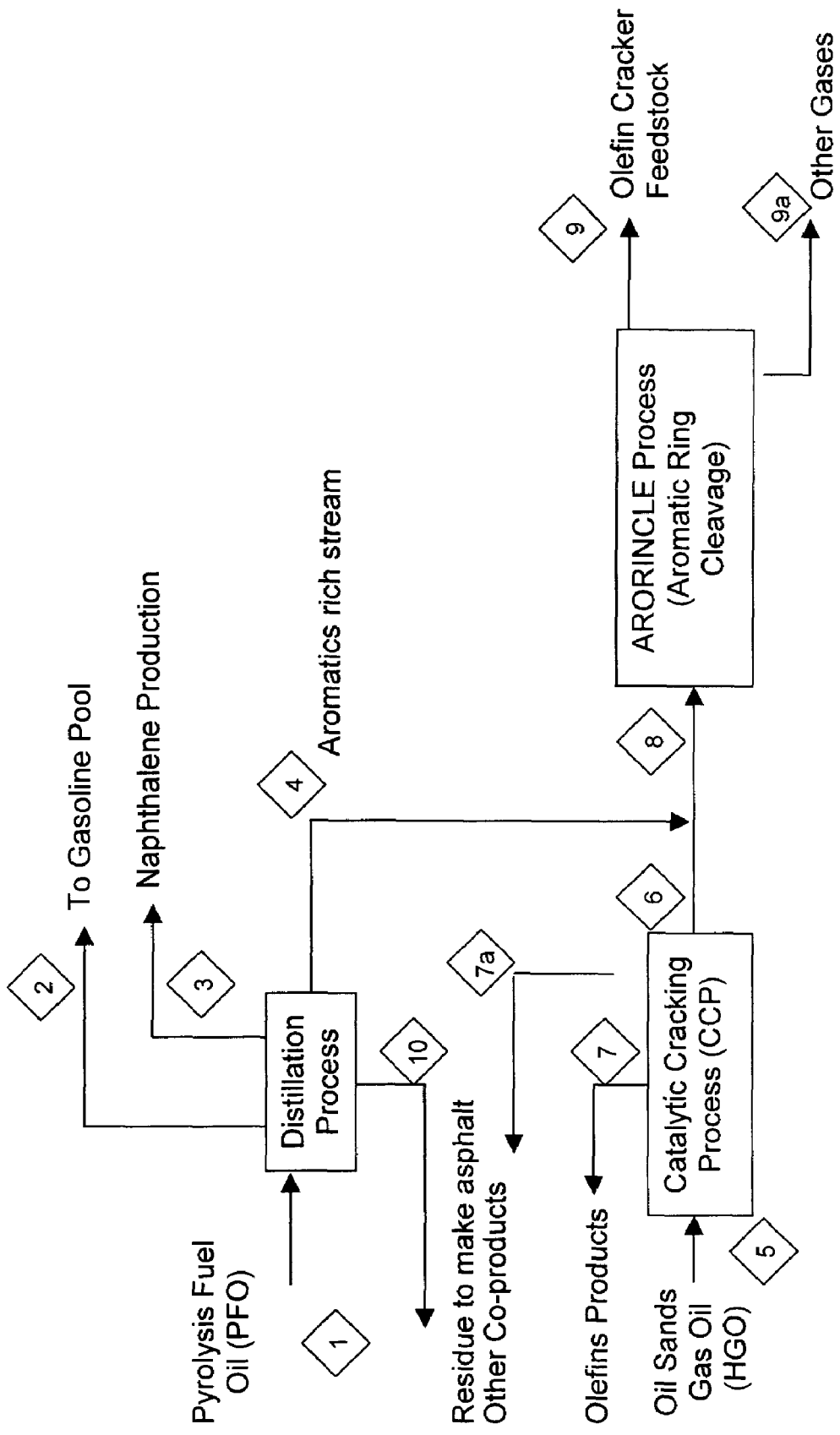
FIG. 1 is a schematic drawing showing the streams and process steps for the present invention.

In accordance with the present invention one of the feedstocks is pyrolysis fuel oil typically the heavy distillate separated from the pyrolytic processing of hydrocarbons like ethane, propane, butane, naphtha or gas oils. Pyrolysis fuel oil is typically distilled from the heavy residues from the pyrolysis of the above hydrocarbons at high temperatures and low pressure, generally under pressures from about 137 to about 276 KPa and temperatures from about 750° C. to about 900° C. The pyrolysis fuel oil may be obtained from a steam cracker for the production of olefins (e.g. ethylene and propylene). The aromatic rich stream of the pyrolysis fuel oil may have a boiling point in the range of 150° C. to 450° C., preferably 150° C. to 400° C. Generally these oils have a high aromatic content. The pyrolysis fuel oil is fed to one or more distillation columns and heated at a pressure from 20 KPa to 335 KPa (about 3 to 50 psi) preferably 20 to 69 KPa (about 3 to 10 psi) and a temperature from 200° C. to 600° C., preferably 220° C. to 540° C. The overhead from the distillation column(s) is typically a $C_{4-8}$ saturated hydrocarbon stream typically useful in the gasoline fraction of a refinery. The stream from the upper to middle of the column is typically a naphthalene rich stream. The stream from the middle to the lower part of the column is rich in aromatics typically comprising from 5 to 80 weight % one or more aromatic ring hydrocarbons and from 95 to 20 weight % of saturated hydrocarbons, preferably from 10 to 70 most preferably from 35 to 60 weight % of the aromatic ring hydrocarbon. The aromatic ring hydrocarbons are generally $C_{6-20}$ hydrocarbons (e.g. benzene, toluene, xylene, naphthalene, etc.) which are unsubstituted or substituted by lower alkyl radicals such as $C_{1-8}$, preferably $C_{1-4}$ alkyl radicals. The residue from the distillation of the pyrolysis fuel oil is a heavy residue generally used to make asphalt.

A second component for the integrated feed of the present invention is a gas oil derived from the distillation of oil from oil sands or tar sands such as the Athabasca tar sands in northern Alberta or from bitumen.

The oil sand gas oil is produced by the low pressure distillation of heavy crude oil obtained from the tar sands under pressures from about 7 to about 13 KPa and temperatures from about 120° C. to about 250° C. at those pressures. Typically this type of cut is a (heavy) gas oil (HGO) and typically boils in the true boiling range of 613° K to 813° K (340° C. to 540° C.). HGO also comprise a $C_{20}$ to $C_{100}$ fraction having a high aromatic content.

The gas oil typically comprises a mixture of heavy aromatic ring compounds. The heavy gas oil may comprise aromatics typically comprising from 30 to 80 weight % one or more aromatic ring hydrocarbons and from 70 to 20 weight % of saturated hydrocarbons, preferably from 30 to 70 most preferably from 35 to 60 weight % of the aromatic ring hydrocarbon.

The (heavy) gas oil is fed to a catalytic cracking unit which may be operated at pressures from 0.05 to 0.15, MPa (g) (gage) and temperatures from 450° C. to 850° C., preferably 500° C. to 700° C. Several steps occur in the catalytic cracking process. The feed, a liquid which could be hydrogenated prior to contact with the catalyst, is contacted with a bed of catalyst, typically a fluidized bed of catalyst. The resulting product is then separated typically in a distillation process.

The catalyst may be selected from the group consisting of natural zeolites, synthetic zeolites, bauxite, the residue produced by the removal of aluminum from bauxite, alkali oxides, alkaline metal earth oxides, aluminum phosphates, transition metal oxides and mixtures thereof. Generally the catalyst is used together with a binder in the form of pellets, extrudates or ring having a particle size from 0.1 to 10 mm.

Suitable alkali oxides include sodium and potassium oxide. Suitable alkaline earth metal oxides include calcium oxide. Suitable transition metal oxides include oxides of iron, copper, titanium, vanadium, chromium, nickel, molybdenum, zirconium, ruthenium and palladium.

A good discussion of zeolites is contained in The Kirk Othmer Encyclopedia of Chemical Technology, in the Third Edition, Volume 15, pages 638-668, and in the Fourth Edition, Volume 16, pages 888-925. Zeolites are based on a framework of $AlO_4$ and $SiO_4$ tetrahedra linked together by shared oxygen atoms having the empirical formula $M_{2/n}O \cdot Al_2O_3 \cdot ySiO_2 \cdot wH_2O$ in which y is 2 or greater, n is the valence of the cation M (typically an alkali or alkaline earth metal (e.g. Na, K, Ca and Mg), and w is the water contained in the voids within the zeolite. Structurally zeolites are based on a crystal unit cell having a smallest unit of structure of the formula $M_{x/n}[(AlO_2)_x(SiO_2)_y] \cdot wH_2O$ in which n is the valence of the cation M, x and y are the total number of tetrahedra in the unit cell and w is the water entrained in the zeolite. Generally the ratio y/x may range from 1 to 100. The entrained water (w) may range from about 10 to 275. Natural zeolites include chabazite (in the structural unit formula M is Ca; x is 4; y is 8; and w is 13), mordenite (in the structural unit formula M is Na; x is 8; y is 40; and w is 24), erionite (in the structural unit formula M may be Ca, Mg, $Na_2$ or $K_2$; x is 9; y is 27; and w is 27), faujasite (in the structural unit formula M may be Ca, Mg, $Na_2$ or $K_2$; x is 59; y is 133; and w is 235), clinoptilolite (in the structural unit formula M is $Na_2$; x is 6; y is 30; and w is 24). Synthetic zeolites generally have the same unit cell structure except that the cation may in some instances be replaced by a complex of an alkali metal, typically Na and tetramethyl ammonium (TMA) or the cation may be a tetrapropylammonium (TPA). Synthetic zeolites include zeolite A (in the structural unit formula M is $Na_2$; x is 12; y is 12; and w is 27), zeolite X (in the structural unit formula M is $Na_2$; x is 86; y is 106; and w is 264), zeolite Y (in the structural unit formula M is $Na_2$; x is 56; y is 136; and w is 250), zeolite L (in the structural unit formula M is $K_2$; x is 9; y is 27; and w is 22), zeolite omega (in the structural unit formula M is $Na_{6.8}TMA_{1.6}$; x is 8; y is 28; and w is 21) and other zeolites wherein in the structural unit formula M is $Na_2$ or $TPA_2$; x is 3; y is 93; and w is 16. Preferred zeolites have an intermediate pore size typically from about 5 to 10 angstroms (having a constraint index of 1 to 12 as described in U.S. Pat. No. 4,016,218). Synthetic zeolites are prepared by gel process (sodium silicate and alumina) or a clay process (kaolin) which form a matrix to which a zeolite is added. Some commercially available synthetic zeolites are described in U.S. Pat. No. 4,851,601. The zeolites may undergo ion exchange to entrain a catalytic metal or may be made acidic by ion exchange with ammonium ions and subsequent deammonization (see the Kirk Othmer reference above). A hydrogenation metal component such as platinum, palladium, nickel or other transition metals such as group VIII metals may be present in (e.g. entrained within the pores) or exchanged or impregnated into the zeolite in amounts from 0.1 to 10 weight %.

Combinations of catalysts may be used in accordance with the present invention. One useful combination is a mixture of one or more alkali or alkaline earth metal oxides and one or more zeolites. Preferably the zeolites are selected from the group consisting of one or more intermediate pore size zeolites (as noted above). The catalyst may be mixed in the sense of being commingled.

The bed is typically a fluidized bed of catalyst but it may also be used in a fixed or moving bed mode. The catalyst bed is recharged or re-generated during the process. The catalyst is used in amounts to provide from 10 to 30 weight % typically 15 to 25 weight %, based on the weight of the feed in the bed. In the process hydrogen may also be added to the feedstock in an amount to provide from 0 to 10 weight %, typically from 0.05 to 5, most preferably from 0.01 to 3 weight % based on the feedstock.

The product from the catalyst bed is then passed to a distillation process to separate out a stream of olefins (e.g. $C_{2-4}$ olefins), a stream of products useful in the gasoline pool (e.g. $C_{4-8}$ saturated and unsaturated compounds) and a stream of heavy aromatic compounds (cycle oils). The distillation process may be conducted at pressures from about 3 to 30, typically from about 5 to 14 psi (from 20 to 207 KPa typically from 34 to 96 KPa) and at temperatures from about 100 to 480, preferably from 120 to 400° C. The product stream from the bottom or lower part of the distillation column of heavy aromatic compounds typically comprises from 10 to 70, preferably from 30 to 70 weight % one or more aromatic ring hydrocarbons and from 90 to 30, preferably from 70 to 30 weight % of saturated hydrocarbons (residual oils).

In accordance with the process of the present invention the heavy aromatic streams from the catalytic cracking process and the distillation process may be used individually or in a blend. If blended the streams are blended in a weight ratio from 1:10 to 10:1, preferably from 1:4 to 4:1. The stream should comprise comprises from 10 to 70, preferably from 20 to 60, most preferably from 30 to 60 weight % one or more aromatic ring hydrocarbons and from 90 to 30, preferably from 80 to 40, most preferably from 70 to 40 weight % of saturated hydrocarbons.

The pyrolysis fuel oil, the gas oils and/or cycle oils may contain heteroatoms such as nitrogen, oxygen or sulphur atoms and particularly nitrogen and sulphur. These components may contain from about 5 to 10,000 ppm (parts per million) by weight of sulphur and from about 45 to 200 parts per million by weight of nitrogen. For further processing and particular hydrogenation/ring opening, it is preferred if the resulting product has a sulphur content less than 800, preferably less than 500, most preferably less than 350 ppm by weight and a nitrogen content of less than 10, preferably less than 3, most preferably less than about 0.25 ppm by weight.

In accordance with the present invention the feed stream to the catalytic cracking process and/or the feed stream to the ring cleavage or opening process may be subject to a hydrodenitrogenation and/or hydrodesulphurization and/or hydrogenation prior to or concurrent with such process. If the processes are concurrent the catalyst bed is a mixed bed with the hydrodenitrogenation and/or hydrodesulphurization catalyst up stream. Typically, the process is not concurrent and the hydrodesuphurization/hydrodenitrogenation reactor where also aromatics saturation occurs, is a separate reactor and upstream of the second reactor where most of the ring cleavage or opening occurs.

Transition metal catalyst such as nickel/molybdenum catalyst such as that primarily used for hydrotreating or other hydroprocessing techniques can substantially slow the rate of aging of noble metal catalyst used for hydrogenation and/or ring opening processes. The feed contacts the batch of catalyst comprising the transition metal before it contacts the batch of catalyst comprising the noble metals. The ratio of the amount of transition metal catalyst to noble metal catalyst is preferably 1:1. An effective range of ratios extends from 1:4 to 4:1. The ratio maybe varied to balance desulfurization with aromatic saturation.

The catalysts used in the instant invention are typically, heterogeneous, porous solid catalyst possessing hydrogenation-dehydrogenation functionality. Hydrogenation functionality is required to remove the heteroatoms present in a feed such as gas oil as well as to convert feed aromatics to naphthenes. If a high heteroatom feed is being processed in the first stage reactor there is little or no aromatic saturation. Because the heavy aromatic hydrocarbon feed, contains relatively bulky bicyclic and polycyclic components the catalysts must have a pore size which is sufficiently large to admit these materials to the interior structure of the catalyst where hydrodesulfurization, hydrodenitrogenation and aromatic saturations, involving ring-opening and hydrogenation reactions, can take place. A pore size of at least about 7.4 Angstroms (corresponding to the pore size of the large pore size zeolites X and Y) is sufficient for this purpose. Very large pore sizes greatly exceeding those previously mentioned are not required although could be used. Crystalline zeolite catalysts which have a relatively limited pore size range, as compared to the so-called amorphous materials such as alumina or silica-alumina, titania and zirconia, may therefore be used to advantage in view of their activity and resistance to poisoning.

Crystalline aromatics hydrogenation catalysts, generally the zeolites, and, in particular, the large pore size zeolites having a Constraint Index less than 2 (see discussion below) can be used in the instant invention. For purposes of this invention, the term "zeolite" is meant to represent the class of metallosilicates, i.e., porous crystalline silicates, that contain silicon and oxygen atoms as the major components. Other components are also present, including aluminum, gallium, iron, boron, etc., with aluminum being preferred in order to obtain the requisite acidity. Minor components may be present separately, in mixtures in the catalyst or intrinsically in the structure of the catalyst.

A convenient measure of the extent to which a zeolite provides control to molecules of varying sizes to its internal structure is the Constraint Index of the zeolite. Zeolites which provide a highly restricted access to and egress from its internal structure have a high value for the Constraint Index, and zeolites of this kind usually have pores of small size, e.g. less than 5 Angstroms. On the other hand, zeolites which provide relatively free access to the internal zeolite structure have a low value for the Constraint Index and usually pores of large size, e.g. greater than 8 Angstroms. The method by which Constraint Index is determined and described fully in U.S. Pat. No. 4,016,218, to which reference is made for details of the method. A Constraint Index of less than 2 and preferably less than 1 is a characteristic of the hydroprocessing catalysts used in this invention.

The "Constraint Index" may be determined by continuously passing a mixture of an equal weight of normal hexane and 3-methylpentane over a small sample, of about 1 gram or less, of catalyst at atmospheric pressure according to the following procedure. A sample of the catalyst, in the form of pellets or extrudate, is crushed to a particle size about that of coarse sand and mounted in a glass tube. Prior to testing, the catalyst is treated with a stream of air at 538° C. for at least 15 minutes. The catalyst is then flushed with helium and the temperature adjusted between 288° C. to 510° C. to give an overall conversion between 10% and 60%. The mixture of hydrocarbons is passed at 1 liquid hourly spaced velocity (i.e. 1 volume of liquid hydrocarbon per volume of catalyst per hour) over the catalyst with a helium dilution to give a helium to total hydrocarbon mole ratio of 4:1. After 20 minutes on stream, a sample of the effluent is taken and analyzed, most conveniently by gas chromatography, to determine the fraction remaining unchanged for each of the two hydrocarbons.

The "Constraint Index" is calculated as follows:

$$\text{Constraint Index} = \log_{10}(\text{fraction of n-hexane remaining})/\log_{10}(\text{fraction of 3-methylpentane remaining})$$

The Constraint Index approximates the ratio of the cracking rate constants for the two hydrocarbons. Constraint Index (CI) values for some typical catalysts are:

| Catalyst | CI |
|---|---|
| ZSM-12 | 2 |
| ZSM-38 | 2 |
| Beta | 0.6 |
| ZSM-4 | 0.5 |
| Synthetic Mordenite | 0.5 |
| REY | 0.4 |
| Amorphous Silica-Alumina | 0.6 |

It is to be realized that the above constraint index values typically characterize the specified zeolites but that such are the cumulative result of several variables used in determination and calculation thereof. Thus, for a given zeolite depending on the temperature employed within the aforenoted range of 288° C. to 510° C. with accompanying conversion between 10% and 60%, the Constraint Index may vary. Likewise, other variables such as the crystal size of the zeolite, the presence of possibly occluded contaminants and binders intimately combined with the zeolite may also affect the Constraint Index. It will accordingly be understood by those skilled in the art that the Constraint Index, as utilized herein, while affording a highly useful means for characterizing the zeolites of interest is approximate, taking into consideration the manner of its determination, with the probability, in some instances, of compounding variable extremes. However, in all instances, at a temperature within the above-specified range, the Constraint Index will have a value for any given zeolite of interest.

The nature of the Constraint Index parameter and the technique by which it is determined suggest the possibility that a given zeolite can be tested under somewhat different conditions and thereby exhibit different Constraint Indices. Constraint Index may vary with severity of operation (conversion) and the presence or absence of binders. Other variables, such as crystal size of the zeolite, the presence of occluded contaminants, etc. may also affect the Constraint Index. It may be possible to so select test conditions, e.g., temperatures, as to establish more than one value for the Constraint Index of a particular zeolite, as with zeolite beta. A zeolite is considered to have a Constraint Index within the specified range if it can be brought into the range under varying conditions.

The large pore zeolites, i.e. those zeolites having a Constraint Index less than 2 have a pore size sufficiently large to admit the vast majority of components normally found in the heavy aromatic hydrocarbon feeds. These zeolites are generally stated to have a pore size in excess of 7 Angstroms and are represented by zeolites having the structure of, e.g. Zeolite Beta, Zeolite X, Zeolite Y, faujasite, Ultrastable Y (USY), Dealuminized Y (Deal Y), Mordenite, ZSM-3, ZSM-4, ZSM-18 and ZSM-20. Zeolite ZSM-20 resembles faujasite in certain aspects of structure, but has a notably higher silica/alumina ratio than faujasite, as do the various forms of Zeolite Y, especially USY and Deal Y. Zeolite Y is the preferred catalyst, and it is preferably used in one of its more stable forms, especially USY or Deal Y.

Although Zeolite Beta has a Constraint Index less than 2, it does not behave exactly like a typical large pore zeolite. Zeolite Beta satisfies the pore size requirements for a hydrocracking catalyst for use in the present process but it is not preferred because of its paraffin-selective behavior.

Zeolite ZSM-4 is described in U.S. Pat. No. 3,923,639; Zeolite ZSM-20 in U.S. Pat. No. 3,972,983; Zeolite Beta in U.S. Pat. Nos. 3,308,069 and Re. 28,341; Low sodium Ultrastable Y molecular sieve (USY) is described in U.S. Pat. Nos. 3,293,192 and 3,449,070; Dealuminized Y zeolite (Deal Y) may be prepared by the method found in U.S. Pat. No. 3,442,795; and Zeolite UHP-Y is described in U.S. Pat. No. 4,401,556. Reference is made to these patents for details of these zeolite catalysts.

The last step of the present invention is to treat the stream rich in aromatic compounds (e.g. cycle oil) as described above to a hydrogenation or aromatics saturation step and to a ring opening or ring cleavage step. These steps are typically carried out sequentially and may be conducted in different reactors or different zones in one reactor. The preferred mode is to carry out the reactions in two different reactors.

The hydrogenation step is carried out in the presence of one or more catalysts selected from the group consisting of natural zeolites, synthetic zeolites, bauxite, alkali oxides, alkaline metal earth oxides, aluminum phosphates, transition metal oxides, and mixtures thereof. Generally the catalyst is used together with a binder to produce pellets, extrudates or rings having a particle size from 0.1 to 10 mm.

Suitable alkali oxides include sodium and potassium oxide, suitable alkaline earth metal oxides include calcium oxide and suitable transition metal oxides include oxides of iron, copper, titanium, vanadium, chromium, nickel, molybdenum, zirconium, ruthenium and palladium. One particularly preferred catalyst for the aromatics saturation step is Ni—Mo or Ni—W catalyst supported on alumina. The catalyst may comprise up to about 25 weight % of active metal on the support. For example Ni—Mo catalyst may comprise from 0.5 to 10, preferably from 1 to 5 weight % weight % of Ni (expressed as NiO) and from 1 to 30, preferably from 5 to 20 weight % of Mo (expressed as $MoO_3$) based on the weight of the support.

Typically for the Ni—Mo and Ni—W catlaysts the hydrogenation step is conducted at temperatures from about 250° C. to 450° C., preferably from 350° C. to 450° C. If the Ru, Pt, Pd or metallic Ni catalysts are used the temperatures are significantly lower and could be in the range for 50 to 350° C. Typically the process is carried out at pressures from about 0.5 to 10 MPa, typically from 1 to 5 MPa. Hydrogen is added to the reaction in an amount to provide an hourly space velocity greater than 0.5 $hr^{-1}$ and less than about 1.5 $hr^{-1}$.

The hydrogenated stream is then fed to a ring opening or ring cleavage section of the reactor or a separate ring opening reactor. The hydrogenated feed stream is contacted with a porous catalyst such as a large pore size zeolite as described above. One particularly useful zeolite is ZSM-5.

The ring opening process could be conducted at similar or different temperatures and pressures as the hydrogenation reaction step. The process is preferably operated in a trickle bed-mode using a modified zeolite catalyst.

The present invention provides an integrated process comprising the unit operations described above.

The present invention will be illustrated by the following example.

EXAMPLE 1

FIG. 1 shows in schematic form the integrated process of the invention which is geared towards the production of petrochemical feedstocks, including units that carry out aromatics saturation and ring cleavage to produce paraffins. $C_{2-4}$ olefins are also co-produced in the process of the present invention.

Pyrolysis Fuel Oil (1) as feed goes into a distillation column where it is distilled into gasoline (2), a naphthalene rich stream (3), an aromatics rich stream (4) and residue (10). Stream (3) could go into further processing for pure naphthalene production or be combined with stream (4) as aromatics rich stream. The residue could be blended into a refinery stream for making asphalt. Stream (2) is easily blended into pyrolysis gasoline, which eventually after processing goes into the gasoline pool.

On the other hand, Gas Oils (atmospheric and vacuum) derived from tar sands operation or gas oils derived from bitumen is fed into a Fluidized Bed Cracking Unit as stream (5). This unit could be of the fluidized bed reactor type or of the fixed bed reactor type. Mode of operation is such as to maximize olefins yield instead of maximizing gasoline yield. Depending on the nature of the feed, hydrotreatment may be required prior to entering the FCC type unit.

This unit produces olefins as product (stream (7)), other products (7a), and an aromatics rich stream (6). Stream (4) and stream (6) are then combined together as stream (8) and fed into an "ARORINCLE" (ARomatic RIng CLEavage) Process Unit. In this Unit, the aromatics rich stream is reacted with hydrogen in the presence of one or more catalyst(s) to produce mainly paraffinic petrochemical feedstocks.

The process described above and shown schematically in FIG. 1 was modeled based on laboratory scale experiments using computer programs that model commercial operations. The results of the modeling and experiments as shown in the mass balance is set forth in Table 1 below.

TABLE 1

| | 1 | 2 | 3 | 4 | 5 | 6 | 7 | 7a | 8 | 9 | 9a | 10 |
|---|---|---|---|---|---|---|---|---|---|---|---|---|
| Composition(Tons/day) Dry Gas | | | | | | | | | | | | |
| Hydrogen | | | | | | | | 30.8 | | | | |
| Methane | | | | | | | | 439.6 | | | 18.5 | |
| Ethane | | | | | | | | 293.1 | | 49.2 | | |
| Ethylene | | | | | | | 605.5 | | | | | |
| LPG | | | | | | | | | | | | |
| Propane | | | | | | | | 196.7 | | 229.2 | | |
| Propylene | | | | | | | 551.6 | | | | | |
| Butane | | | | | | | | 100.3 | | 63.4 | | |
| Butylenes | | | | | | | 289.3 | | | | | |
| C5 plus | | 8.0 | | | | | | 590.1 | | | 106.6 | |
| Naphthalene | | | 202.4 | | | | | | | | | |
| Aromatics | | | | 99.0 | | 374.1 | | | 473.1 | | 6.2 | |
| Gas Oil | | | | | 3857.0 | | | | | | | |
| PFO | 457.3 | | | | | | | | | | | |
| Heavy | | | | | | | | 385.6 | | | | 147.9 |
| MASS TOTAL: | 457.3 | 8.0 | 202.4 | 99.0 | 3857.0 | 374.1 | 1446.4 | 2036.5 | 473.1 | 341.8 | 131.3 | 147.9 |

What is claimed is:

1. An integrated process for the production of paraffins and olefins from a feedstock selected from the group consisting of:
   i) gas oils obtained from the distillation at a temperature from 120° C. to 250° C. and a pressure from 7 Kpa to 13 KPa of heavy crude oil obtained from oil sands; and
   ii) a mixture of pyrolysis fuel oil distilled at a temperature from 750° C. to 900° C. and a pressure from 137 to 276 KPa from the heavy residues from the steam cracking of paraffins and gas oils obtained from the distillation at a temperature from 120° C. to 250° C. and a pressure from 7 Kpa to 13 KPa of heavy crude oil obtained from oil sands comprising:
   a) distilling the pyrolysis fuel oil in a distillation column at a pressure from 20 KPa to 335 KPa and a temperature from 200° C. to 600° C. and recovering a stream from the middle to lower part of the column having a boiling point range of 150 to 450° C. comprising from 5 to 80 weight % of aromatic ring hydrocarbons and from 95 to 20 weight % of saturated hydrocarbons;
   b) catalytically cracking said gas oils derived from oil sands in a catalytic cracking unit at a pressure from 0.05 to 0.45 MPa and a temperature from 450° C. to 850° C. so as to produce mainly olefins, gasoline and a stream comprising from 30 to 70 weight % of one or more aromatic ring hydrocarbons and from 70 to 30 weight % of saturated hydrocarbons having a boiling point range of 340 to 540° C. in the presence of a catalyst selected from the group consisting of natural zeolites, synthetic zeolites, bauxite, the residue produced by the removal of aluminum from bauxite, alkali oxides, alkaline metal earth oxides, aluminum phosphates, transition metal oxides and mixtures thereof;
   c) combining the said stream comprising from 30 to 70 weight % of one or more aromatic ring hydrocarbons and from 70 to 30 weight % of saturated hydrocarbons from gas oil and the stream from the middle to lower part of the column of the distillation of the pyrolysis fuel oil in a weight ratio from 1:10 to 10:1;
   d) processing the stream from step (c) in an integrated unit to reduce the sulphur content to less than 800 ppm by weight and the nitrogen content to less than 10 ppm by weight and saturate aromatic rings in the presence a catalyst selected from the group consisting of alkaline earth metal oxides and transition metal oxides of iron, copper, titanium, vanadium, chromium, nickel, molybdenum, tungsten, zirconium, ruthenium, platinum and palladium supported on a zeolite having a pore size of at least 7.4 Angstroms and a constraint index of less than 2; and
   e) subjecting the resulting stream to a ring cleavage in the presence of a zeolite having a pore size of at least 7.4 angstroms and a constraint index of less than 2 to produce mainly paraffinic petrochemicals feedstocks.

2. The process of claim 1, wherein the catalytic cracking unit of step (b) comprises a fluidized bed reactor operating at temperatures between 500° C. and 700° C. and pressures between 0.05 and 0.15 MPa(g).

3. The process of claim 2, wherein the aromatics saturation of step (d) is carried out in the presence of hydrogen at an hourly space velocity greater than 0.5 $hr^{-1}$ and less than about 1.5 $hr^{-1}$.

4. The process of claim 2, wherein the ring cleavage of step (e) is operated in a trickle bed-mode using a modified zeolite catalyst.

* * * * *